June 28, 1960 H. W. HENKELS 2,943,006

DIFFUSED TRANSISTORS AND PROCESSES FOR MAKING THE SAME

Filed May 6, 1957

United States Patent Office 2,943,006

Patented June 28, 1960

2,943,006

DIFFUSED TRANSISTORS AND PROCESSES FOR MAKING THE SAME

Herbert W. Henkels, Milford Township, Somerset County, Pa., assignor to Westinghouse Electric Corporation, East Pittsburgh, Pa., a corporation of Pennsylvania Filed May 6, 1957, Ser. No. 657,355

12 Claims. (Cl. 148—1.5)

This invention relates generally to transistors and processes for manufacturing them.

In the manufacture of transistors, since the parts ordinarily are of such small dimensions, great difficulty has been experienced in properly preparing and uniting the various members employed therein.

In making emitter, collector and base regions by conventional fusion techniques, difficulties have been experienced in adequately controlling the processes to achieve the range of small base thicknesses required for high gain and high frequency operation. On the other hand, in applying conventional gaseous diffusion techniques which do permit achieving the small base thicknesses necessary for high frequency operations great difficulty has arisen in reducing base resistance in the thin diffused base regions and in making external contacts to the transistor without penetrating the thin diffused regions.

The object of the invention is to provide for the building up of certain members of a transistor in a prepared blank by processes that may be so controlled, that such accuracy in the dimensions of the members builtup can be effected, that damage to the other members is avoided.

It is also an object of the invention to provide processes for making transistors which can be practiced by operators of ordinary skill and with apparatus that is readily available.

Another object of the invention is the production of a transistor, the members of which are designed to such dimensions and made with such accuracy that the product functions efficiently at high frequencies with low power loss.

The invention accordingly comprises the several steps and the relation and order of one or more of such steps with respect to each of the others, and the article possessing the features, properties and the relation of elements, which are exemplified in the following detailed disclosure and the scope of the application of which will be indicated in the claims.

For a fuller understanding of the nature and objects of the invention, reference should be had to the following detailed description taken in connection with the accompanying drawing, in which.

Figure 1:
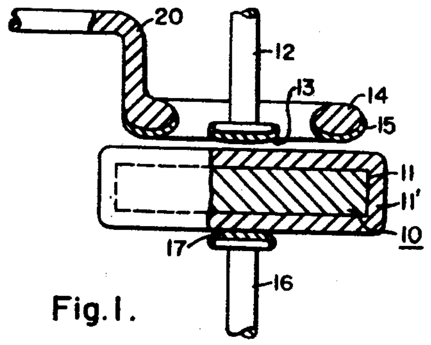
Figure 1 is a view partly in side elevation and partly in section of the members of a transistor arranged in their proper relative positions preparatory to the processing required to unite them.

The process to be described hereinafter may be utilized for making transistors from either silicon or germanium. It may be also employed to make NPN, PNP, PNIP and NPIN transistor structures, all of which are well known in the art.

In the manufacture of transistors of the different types identified hereinbefore for different purposes, a crystal wafer or blank which will enable the meeting of design specifications will be selected or prepared. It has been found in practicing the process, to be described hereinafter, that when manufacturing an NPN transistor from a silicon crystal wafer or blank that it should have a resistivity of from 1 ohm centimeter to about 20 ohm centimeters. In the making of a PNP transistor it has been found advantageous to employ semiconductor wafers in which the lower limit of resistivity is higher than specified for the NPN transistor. Good results were obtained in PNP transistors when a silicon blank or wafer had a resistivity of from 5 ohm centimeters to about 30 ohm centimeters. The PNIP and NPIN transistors require the use of a blank of silicon having from about 50 ohm centimeters to 1000 ohm centimeters resistivity. The I portion of PNIP or NPIN indicates either high resistivity or intrinsic semiconductor material.

The dimensions depend on the particular electrode geometry chosen and on the frequency and power requirements of the design. Two principal geometries of emitters can be employed, namely, disc and strip shaped. The former generally is preferred for low current operations of small devices, while the latter has advantages at higher current and power levels. In disc form, the dimensions will depend upon the operating frequency. A disc should be approximately 3 or 4 mils in diameter at 200 megacycles. The diameter of the disc will be decreased for higher frequencies, and increased for lower frequencies and in the commercial broadcast range the disc should be of the order of 20 to 30 mils in diameter. Combinations of the two forms are possible. For example, the emitter may have the form of an annulus or perhaps of a split disc. In strip form, essentially the same peripheral edge extension will be employed for a given operating level but the area of the emitter will be reduced because of the strip form. The base will take a geometry approximating the emitter shape. For example, with a strip emitter, the base will consist of parallel strip segments. With disc emitter, the base will have the form of a ring or a flat member with circular hole enclosing the emitter. The collector form will be rectangular or disc shaped depending on the particular application. The small area of the collector will be dictated by considerations of operating power level and frequency. In the I.-F. range, the collector diameter may be in the range of 15 to 25 mils in diameter, at 200 megacycles it may be close to 4 to 5 mils. The area of the collector permitted for a given operating frequency and specification will be determined in part by the structure. In general, the PNIP and the NPIN structures may be made to the specification of PNP and NPN types with somewhat smaller collectors.

The semiconductor blanks are chosen to provide the structures desired. For the I.-F. range of frequencies in employing NPIN structure these units may be 80 x 80 mils and thickness about 2 mils. The dimensions of the blank and parts in any particular case are chosen to provide the desirable base resistance, collector capacitance, and the required alpha or current gains at the desired operating frequencies.

In preparing the wafers or blanks the section of silicon or germanium is cut from a crystal that has been doped in growing to give it predetermined carrier characteristics. The blank is then ground or lapped and finally etched to dimensions.

There are many different types of etching solutions suitable for etching both silicon and germanium. An etching solution comprising a mixture of nitric acid, hydrofluoric acid and bromine plus a small addition of acetic acid has been found to be satisfactory.

When the blank has been prepared, it is subjected to three essential steps in practicing the process. These are not the only steps in the process, but they are steps which enable the making of the transistor with precision, which assures the meeting of design specifications and avoids the high percentage of rejects which has been common in practicing the processes employed heretofore.

The three essential steps which give the control and assure precision in the dimensions of the elements of the transistor are, first the diffusion of a doping impurity having predetermined carrier characteristics into the blank, next the fusion of certain elements to the blank and then the diffusion into the blank of doping impurities carried by the members fused to the blank.

The diffusion steps take a substantial period of time to effect penetration of the doping impurities to predetermined depths in the blank and therefore can be controlled with great accuracy. The rates of diffusion of the impurities are known and so the time required for a particular impurity to penetrate into the blank to a selected depth can be readily predetermined.

The type of transistor to be manufactured will determine the impurity to be employed for doping the silicon or germanium blank to give it a predetermined carrier characteristic. When a blank of high resistivity silicon or germanium has been prepared, it will be then subjected to a sequence of diffusion, fusion and diffusion process steps. The elements selected for doping will depend on the type of transistor to be made and will be described in detail hereinafter. In making an NPN transistor the blank to be utilized is made from a silicon or germanium crystal which has been doped with an N-type impurity in growing it.

The first step involves the application and diffusion of a doping impurity from group III of the periodic table, such as aluminum or gallium, into the blank to give a portion of the surface or a surface layer a predetermined carrier characteristic. The diffusion process should be continued until the doping impurity has penetrated into the wafer 10 to a depth of over 0.5 mil. Since the rate of diffusion for any given temperature of these doping impurities into silicon or germanium is known, the depth of penetration can be controlled with great accuracy. The surface portion or layer that has been subjected to the diffusion of aluminum or gallium will eventually become an extension of the base element of the NPN transistor.

In making a PNP type transistor the blank will be cut from a crystal which was doped with a P-type impurity in the process of growing it to give it a P-type carrier characteristic. The surface of the crystal will next be doped with an element selected from group V of the periodic table. Good results have been obtained by the selection of arsenic, antimony or phosphorus for diffusion into a surface portion of the P-type blank. The arsenic, phosphorus and antimony may be applied as vapors to the surface of the blank. The diffusion process should be continued until the doping impurity has penetrated into the wafer to a depth of over 0.5 mil.

In making PNIP or NPIN-type transistors, a blank having somewhat different characteristics will be prepared. The crystal from which it is prepared should not be doped in the process of growing. Therefore, the blank will be of high resistivity silicon or germanium when the process of preparing the transistor is started. The blank will be cut from the crystal, lapped and etched in the same manner as described hereinbefore to reduce it to the correct size.

Referring now to the drawing, and Fig. 1 in particular, a rectangular blank 10 is shown which has been treated by diffusion with a doping impurity until the latter has penetrated to the dotted line 11. The impurity selected for the diffusion step will depend upon the type of transistor that it is desired to make.

A description will be given of the application of the process to the production of, first, an NPN silicon transistor, and second, a PNP germanium transistor. In making an NPN transistor, a silicon blank doped with an N-type impurity will be employed. In the case of a PNP transistor, a germanium blank doped with a P-type impurity will be employed. When a silicon blank 10 is employed for making an NPN transistor, an impurity such as aluminum or gallium will be diffused at a temperature of from 1000° C. to 1300° C., into a surface portion or layer, to a depth of over 0.5 mil. After the diffusion step, the surface area 11' has P-type conductivity while the internal area of the wafer enclosed by the line 11 still has an N-type doping impurity dominant. Therefore, in the wafer 10 there are two sections or zones carrying opposite types of doping impurities. In making a germanium NPN transistor in order to produce an N-type surface layer an element from group V of the periodic table will be diffused at a temperature of, for example, 700° C. to 900° C., into the prepared wafer 10.

The next step in the process involves the preparation of an emitter alloy. In making a silicon NPN transistor the emitter may be made from a suitable alloy carrying two impurities which have opposite doping characteristics in silicon. Two alloys found to be satisfactory are, first, a composition of gold, aluminum and antimony, and second, silver, aluminium and antimony. In the first alloy the gold content should be approximately 99% to 99.5%. In the second alloy, silver should make up 99% to 99.5%. The aluminum and antimony will make up the remainder, and will be present in such a ratio as to produce an N-type redeposit on the P-type material when fused to the blank 10. The antimony to aluminum ratio should be equal to one or more than one. The particular doping agents in the alloy are selected because the P-type impurity, aluminum, has a much greater diffusion rate than the N-type impurity, antimony.

In making a PNP germanium transistor the emitter alloy employed will contain N-type and P-type doping agents in such ratio that the different segregation coefficients of the materials will effect a P-type redeposition of germanium therefrom after fusion of the emitter alloy to the germanium blank 10. Such an alloy can be almost pure indium with a small trace of arsenic.

In making a silicon NPN transistor, a member 12 simulating a nail, or an L-shaped flat wire or ribbon, is prepared from some inert material such as tantalum, tungsten or molybdenum. The head of the nail 12 is coated with a layer 13 of suitable emitter alloys such as gold, aluminum and antimony when making a silicon NPN transistor and indium-arsenic when making a germanium transistor. The alloys may be applied to the nails in any manner, as for example, by dipping the heads of the nails into the alloy when the latter is in a molten state or by wrapping a thin sheet of the alloy around the head of the nail and then fusing it. Further, a very thin coat of either alloy may be applied readily by evaporation or some well-known plating process.

The thickness of the coating or alloy layer 13 should be of the order of 0.1 to 1 mil.

Next a ring 14 or some other contact member of suitable shape and carrying a layer or coating 15 of a selected alloy containing a doping impurity will be prepared. The ring 14 with the proper coating 15 of a doping impurity is employed for making electrical contact with the base element of the transistor. A base contact also can be readily applied by the evaporation of a suitable member onto or the fusing of a connection to the base materials.

In the making of a silicon NPN transistor another inert nail-shaped member 16 will be coated with an N-type doping impurity layer 17. In making a germanium PNP transistor a coating 15 of indium will be employed.

Next the blank 10 and the members 12, 14 and 16 carrying the coatings 13, 15 and 17 will be mounted in graphite jigs in predetermined relative positions. The graphite jigs will not be described, since their use is generally well known in the art. After the members have been brought into contact with the blank 10, they will be subjected to a temperature above 1200° C. but below the melting point of silicon for the silicon transistor and above 800° C. but below the melting point of germanium for the germanium transistor. This is in excess of the desired diffusion temperatures for the materials identified. At these temperatures, the members 12, 14 and 16 with their coatings 13, 15 and 17 are fused to the blank 10. The coatings fuse with some of the adjacent silicon or germanium to form a melt which is rich in silicon or germanium. The structures are then allowed to cool from 100° C. to 300° C. below the fusion temperature to the diffusion temperatures. During the cooling silicon or germanium redeposits from the fused coatings 13, 15 and 17. The redeposited silicon or germanium is doped with the impurity in these coatings.

In the making of an NPN transistor employing a silicon blank 10 in the fusing of the members to one another, the doping impurities are aluminum and antimony in the layer 13 carried by the member 12 and the process is so carried out that the layer 13 will melt and penetrate entirely through the outer layer 11' of the blank 10 which has been doped with a P-type impurity. The coating 15 of P-type doping impurity on the ring 14 will be permitted to melt and penetrate into but not through the P-type layer 11' of the blank 10. The layer 17 of N-type doping impurity carried by collector member 16 will be caused to melt and penetrate through the P-type layer 11' of the blank 10.

In the making of a PNP transistor utilizing a germanium blank 10, the indium and arsenic emitter alloy layer 13 will penetrate through the outer layer 11' of blank 10 which has been doped to provide an N-type layer in the first diffusion step. The layer 15 of the doping alloy, for example, gold and antimony, carried by the ring 14, will be permitted to enter into and alloy with the N-type layer 11' of the blank 10 but not penetrate through it. The layer 17 of P-type material carried by member 16 will be caused to penetrate through the N-type layer 11' of the blank 10.

It is not essential that both the coatings or layers 13 and 17 be fused to the blank 10 at the same time. The member 12 with coating 13 may be fused to the blank 10 first, and then the next diffusion step completed. The member 16 with coating 17 may be fused at a later time, since it plays no part in the second diffusion step of the process. Before the member 16 with coating 17 is fused to the blank 10, the part of the blank 10 to which it is to be fused is preferably lapped and etched to remove all extraneous matter. When the member 16 is fused to the blank 10, care should be taken to ensure that it does not penetrate through the central portion of the blank.

Figure 2:
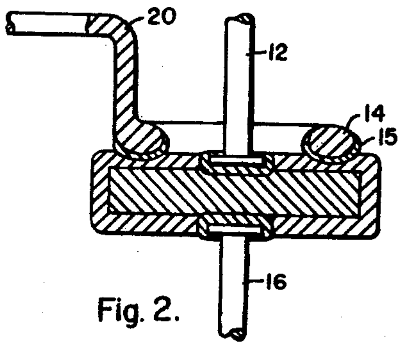
Fig. 2 is a view in section of the members illustrated in Fig. 1 after the first processing step.
Figure 3:
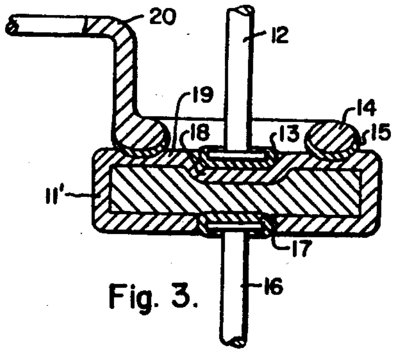
Fig. 3 is a view in section of the upper portion of the transistor structure illustrated in Fig. 2 showing the disposition of the elements after the second process step employed in making the transistor.

The structure shown in Fig. 2, prepared, for example, for making an NPN silicon transistor, will be held at the diffusion temperature of from 1000° C. to 1300° C. for aluminum and antimony, for from 15 to 60 minutes. The aluminum in the redeposited silicon portion of the layer 13 will diffuse further into the blank 10 than the antimony. Such diffusion of the aluminum will establish a P-type layer 18 which connects at the ends with the P-type layer 11' of the blank 10 forming a base element 19 of the transistor, as shown in Fig. 3.

In this second diffusion step, since aluminum and antimony have different diffusion rates, the aluminum having the higher diffusion rate, there is provided a layer 18 doped with a P-type material while the layer 13 which includes the redeposited silicon, will retain an excess of antimony over aluminum which will produce an N-type silicon layer. Therefore, as seen in Fig. 3, we have three elements 13, 19 and the central portion 22 of the blank 10 in which the N and P doping alternates whereby there are two P–N junctions. In the layer 13, which constitutes the emitter, the N-type doping material will dominate. In the next layer or base 19 the doping material, which is aluminum, is of the P-type and it is dominant, while in the central portion 22 of the blank 10, N-type doping prevails.

The layer 17 carried by the member 16 is so fused to the blank 10 that the layer 17 of N-type doping material penetrates through the outer layer dominated by the P-type doping material and is connected to the material in the central portion of the blank 10 having N-type doping characteristics, thereby providing an NPN transistor. The members 12 and 16, which were utilized for supporting the layers 13 and 17 of doping impurities in predetermined positions relative to the blank 10, will be, on the cooling of the assemby, rigidly fastened to the structure through the alloy regions of layers 13 and 17 and are utilized for making electrical contact to the members of the transistor.

A member 20 employed for supporting the ring 14 may be utilized for making electrical contact to the base 18 of the transistor. The members 12, 16 and 20 are essentially lead terminals and will be made of materials having capacity for conducting electrical current but which are substantially inert and are not affected by the diffusion and fusion processes practiced in the process of making the transistor. Materials such as tantalum, tungsten or molybdenum have been found to be quite satisfactory for making the members 12, 16 and 20.

The fusion of the layers 13, 15 and 17 to the blank 10 in making the germanium PNP transistor will be very similar to the processes described for the manufacture of the silicon NPN transistor. The steps will be the same but the diffusion regions will be doped with doping materials of opposite conductivity type. This will be controlled by the doping alloys chosen and the difference in diffusion constants of the doping impurities. The arsenic in the alloy selected will diffuse faster than the indium from the redeposited germanium layer to form a base region 18 of N-type material which will connect to the diffused base region or outer layer located between the dotted line 11 and the surface of the blank, as shown in Fig. 3.

The emitter alloy may be applied to the member 12 in any of the methods described hereinbefore. When it is applied in the form of a sheet of foil, it will be approximately 0.5 mil to 1 mil in thickness. When the coating or layer 13 of the alloy has been applied to the member 12, it is ready for the fusing operation.

The ring 14 will have applied thereto a layer 15 of a suitable P-type doping material, for example aluminum, when making an NPN silicon transistor. When making a PNP germanium transistor alloy comprising tin and antimony or gold and antimony having N-type doping characteristics are suitable for applying to the ring 14. During the fusing process the ring is supported by means of the inert member 20.

In making the NPN silicon transistor, the collector element 16, will have an N-type doping impurity alloy, for example, a gold-antimony alloy applied to the upper surface, as shown at layer 17. The N-type doping agent may be arsenic, phosphorus or antimony. In applying the collector element 16, it is important that that part of the blank to which it is to be applied is first cleaned by etching and that the fusing step be controlled to assure that the doping material penetrates through the layer of the blank 10 which was doped by the first diffusion step. Further care must be taken to make sure that the doping material of layer 17 does not penetrate entirely through the blank into contact with the layer 13. After the fusion of the layers 13, 15 and 17 to the blank 10 has been completed, it will be cooled to the diffusion temperature for the doping materials carried by the member 12.

Irrespective of whether or not the layer 17 has been fused to the blank 10 in the first fusing operation, we now have a three-element NPN structure when a silicon blank is employed and a three-element PNP structure when the transistor is made from a germanium blank. If the layer 17 is fused to the blank 10 at the same time as the other members, the transistor whether it be an NPN type or a PNP type, is complete, each having an emitter layer 13, base ring 14 and collector layer 17.

In making a PNIP germanium transistor, the germanium crystal or blank will be doped to produce a 30 to 40 ohm centimeter N-type material. The NPIN silicon transistor will be made from a crystal or blank doped to provide 100 to 500 ohm centimeter P-type material.

When the blank 10 has been cut from a crystal of high resistivity such as silicon or germanium, it will be treated as described hereinbefore. After the blank 10 has been lapped and etched to correct size, it will be subjected to a diffusion process. In the diffusion process for the PNIP germanium transistor an N-type doping material such as arsenic, antimony or phosphorus will be diffused into the surface portion of the blank to a depth of about 1 mil. This provides a blank 10, the central portion of which is a high resistivity N-type germanium with a heavily doped N-type surface layer.

Figure 4:
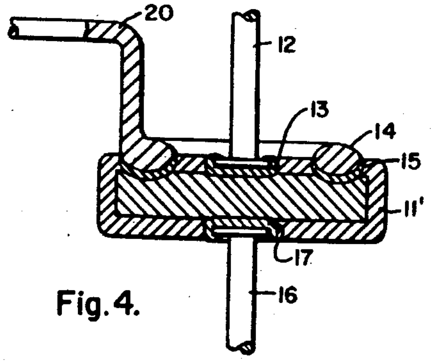
Fig. 4 is a view in section of a different group of elements from that shown in Fig. 2 after they have been subjected to the first process step.

Referring to Fig. 4, in the diffusion process for the NPIN silicon transistor a P-type doping material such as gallium or aluminum will be diffused into the surface layer of blank 10 to a depth to line 11 of about 1 mil. This provides a silicon blank 10, the central portion 22 of which is high resistivity P-type silicon with heavily doped P-type surface layer 11' down to line 11.

The emitter employed in making the NPIN and PNIP transistors will comprise the corresponding emitter alloys including N-type and P-type doping materials as already described for making the NPN silicon and PNP germanium transistors, respectively. The collector member 16 will carry a layer 17 of an N-type doping material for the NPIN silicon transistor and a P-type doping material for the PNIP germanium transistor. The base ring 14 will have applied thereto a P-type layer 15 of doping material for a silicon NPIN transistor and an N-type doping material for the PNIP germanium transistor for making contact with the high resistivity material. The next step will be the fusion step in which the emitter layer 13 and the doping layer 15 carried by ring 14 will be fused to the blank 10. The collector element layer 17 may be fused to the blank 10 in the same fusion step.

In the fusion step the doping material in layer 15 carried by the ring 14 may penetrate through the surface layer 11' between the dotted line 11 and the surface of the blank to be connected with the high resistivity material in the center portion of the blank 10 without causing deterioration of properties. The layer 13 of emitter member 12 will penetrate through the surface layer 11' and enter into the intrinsic or high resistivity material. The emitter alloys are so chosen as to give conductivity types to the redeposited semiconductor which are opposite to those of the high resistivity material and surface layer. At this point in the processing of the NPIN and the PNIP structures, they are actually NIN and PIP types, since the emitter alloys penetrate into the high resistivity P-type and N-type materials, respectively as shown in Fig. 4. Low resistivity base regions of P-type for the NPIN transistor and N-type for the PNIP transistor must be created by the subsequent diffusion process step to be described hereinafter.

Figure 5:
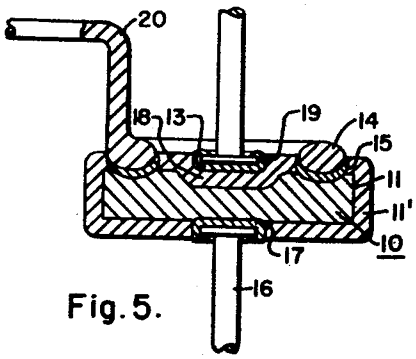
Fig. 5 is a view in section of the upper portion of the transistor structure illustrated in Fig. 4 showing the relative positions of the elements after the second process step.

After the fusing and alloying process step has been completed, the temperature of the members will be lowered and the second diffusion step started. Since the alloy carried by the collector member 12 comprises doping impurity material having different diffusion rates, differential diffusion will take place. The resultant transistor is shown in Fig. 5. In the NPIN silicon transistor, the P-type doping material, aluminum, in the emitter alloy 13 will diffuse faster than the N-type doping material, antimony, to form a layer in which it predominates so as to form the low resistivity P-type base region mentioned hereinbefore. In the PNIP germanium transistor, the N-type doping material, arsenic, will diffuse faster than the P-type doping agent, indium, whereby to form a layer in which it predominates so as to form the low resistivity N-type base region described. This diffusion process step will therefore produce two layers 13 and 18. The layer 18 will be connected with the layer 19 at the blank 10. In this manner it is possible to prepare transistors having four elements. They are identified as PNIP or NPIN structures. The high resistivity or intrinsic material in the center of the blank adapts them for the performance of predetermined special functions known in the art.

Figure 6:
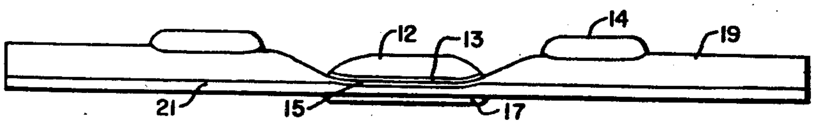
Fig. 6 is a view in section of a transistor after the process steps have been completed.

As pointed out hereinbefore, the process described lends itself to accurate control in making transistors, the members of which have predetermined areas of contact and predetermined thickness to perform the functions required. Transistors which operate efficiently in high frequency systems at low power loss can be made readily by the processes described. In Fig. 6, a PNIP silicon transistor which meets exact specifications for a 100 megacycle power transistor is illustrated. In this embodiment of the invention, the P-type emitter 13 is made of a thickness of $1\times10^{-3}$ centimeters. The N-type base 19 is introduced by a controlled diffusion step and by proper control it is possible to make it $0.14\times10^{-3}$ centimeters in thickness at the center below emitter 13, while further toward the outside at the point where the ring 14 is connected to the base the thickness is $2.5\times10^{-3}$ centimeters. The thickness of the high resistivity material 21, which may be intrinsic or N-type, is $1\times10^{-3}$ centimeters. The thickness is essentially controlled by the depth of alloying of the emitter and the collector alloys and the thickness of the starting blank and is far less critical than that which would be required ($0.14\times10^{-3}$ cm.) in a conventional alloying or diffusion technique. The P-type collector 17, which is fused to the blank of high resistivity material, will be $0.1\times10^{-3}$ centimeters in thickness. The calculations for the specification given hereinbefore were made assuming certain starting silicon materials. Somewhat different parameters will be used for the NPIN silicon design or for the PNIP germanium design.

After the diffusion, fusion, diffusion operations are completed the device must be etched. By carefully controlling an electrolytic etch, a finished structure of the type described in the 100 megacycle example will result.

Transistors made by this diffusion, fusion, and diffusion process possess great merit. This process can be so controlled that certain elements can be made to predetermined dimensions and therefore can be operated at high frequencies with low power loss. For example, the thickness of the base adjacent the ring 14 is of such a dimension that the resistance to the flow of the base biasing current is small. Therefore, in operating the transistor the voltage required to deliver the biasing current may be small, and the base power loss is small. The thickness of the base at the center between the emitter and collector can be made very thin through the exact control which can be effected in the diffusion process. Therefore the transistors made by this diffusion, fusion and diffusion can be used at very high frequencies, and high gains achieved.

The thin base region is achieved without tedious operations and can be effected by the present process in one operation. Difficult soldering operations, which with conventional processes endanger the very thin base region required for high frequency operation, are avoided. The process produces a structure which has all the inherent advantages of drift field operation.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

I claim as my invention:

1. In the process of making a transistor, the steps of preparing a blank from a crystal doped with an impurity in growing to give it a predetermined carrier characteristic, diffusing into an outer portion of the blank a doping impurity of an opposite carrier characteristic from the carrier characteristic of the impurity in the blank to provide a base element, fusing to the blank at the outer portion comprising the base element a member carrying doping impurities of two different carrier characteristics, the member penetrating through the outer portion, the doping impurities carried by the member having different diffusion rates, the doping impurity having the higher diffusion rate being of the same carrier characteristic as the impurity in the base element, the proportions of the two doping impurities in the member being such that the slower diffusing will predominate in the mixture, and diffusing into the blank the doping impurities carried by the member fused to the blank, the doping impurities having the higher rate of diffusion and the same carrier characteristics as the doping impurity in the base element penetrating further into the blank than the impurity having the lower diffusion rate and providing an extension of the base element, the impurity having the lower diffusion rate dominating the zone from which the impurity having the higher diffusion rate is diffused providing an emitter element, thereby providing a structure in which the carrier characteristics of the elements alternate.

2. In the process of making a transistor, the steps of preparing a blank from a crystal doped with an impurity in growing to give it a predetermined carrier characteristic, diffusing into an outer portion of the blank a doping impurity of an opposite carrier characteristic from the carrier characteristic of the impurity in the blank to provide a base element, fusing to the blank at the outer portion comprising the base element a member carrying doping impurities of two different carrier characteristics, the member penetrating through the outer portion, the doping impurities carried by the member having different diffusion rates, the doping impurity having the higher diffusion rate being of the same carrier characteristic as the doping impurity in the base element, and diffusing into the blank the doping impurities carried by the member fused to the blank, the doping impurity having the higher rate of diffusion and the same carrier characteristic as the doping impurity in the base element penetrating further into the blank than the impurity having the lower diffusion rate and providing an extensiono f the base element, the impurity having the lower diffusion rate dominating the zone from which the impurity having the higher diffusion rate is diffused providing an emitter element, fusing to the blank a member carrying a doping impurity corresponding to the doping impurity in the blank, the fusing step causing a penetration into the blank and in conjunction with the blank providing a collector element having the carrier characteristic of the blank, thereby providing a three element structure in which the carrier characteristics alternate.

3. In the process of making a transistor, the steps of, preparing a blank from a crystal doped with an N-type doping impurity, diffusing into the surface portion of the blank a P-type doping impurity, fusing at the P-type surface portion of the blank a member carrying doping impurities of the N-type and P-type, the member penetrating through the outer portion, the N-type and P-type doping impurities carried by the member having different diffusion rates, the doping impurity of P-type having a higher diffusion rate, and diffusing into the blank the impurities carried by the member fused to the blank, the P-type doping impurity penetrating further into the blank than the N-type doping impurity and in conjuction with the surface portion carrying the P-type doping impurity providing a base element, the zone from which the doping impurities are diffused being dominated by the N-type doping impurity providing an emitter.

4. In the process of making a transistor, the steps of, preparing a blank from a crystal doped with an N-type doping impurity, diffusing into the surface portion of the blank a P-type doping impurity, fusing at the P-type surface portion of the blank a member carrying doping impurities of the N-type and P-type, the member penetrating through the outer portion, the N-type and P-type doping impurities carried by the member having different diffusion rates, the doping impurity of P-type having a higher diffusion rate and diffusing into the blank the impurities carried by the member fused to the blank, the P-type doping impurity penetrating further into the blank than the N-type doping impurity and in conjunction with the surface portion carrying a P-type doping impurity providing a base element, the zone from which the doping impurities are diffused being dominated by the N-type doping impurity having the slower diffusion rate becoming an emitter and fusing an element carrying N-type doping impurity to the blank, the fusing step causing the N-type doping impurity to penetrate the surface portion of the blank doped by diffusion and in conjunction with the portion of the blank carrying an N-type doping impurity providing a collector element, thereby providing an NPN structure.

5. In the process of making a transistor, the steps of, preparing a blank from a crystal doped with a P-type doping impurity, diffusing into a surface portion of the blank an N-type doping impurity, fusing into the N-type surface portion of the blank a member carrying N-type and P-type doping impurities the member penetrating through the outer portion, the N-type and P-type doping impurities having different diffusion rates, the N-type doping impurity having the higher diffusion rate, diffusing the N-type and P-type impurities carried by the member into the blank, the N-type doping impurities penetrating further into the blank than the P-type doping impurity and in conjunction with the surface portion of the blank carrying N-type doping impurity providing a base element, the zone from which the doping impurities are diffused being dominated by the P-type doping impurity having the slower diffusion rate becoming an emitter.

6. In the process of making a transistor, the steps of, preparing a blank from a crystal doped with a P-type doping impurity, diffusing into the surface portion of the blank an N-type doping impurity, fusing into the N-type surface portion of the blank a member carrying N-type and P-type doping impurities, the member penetrating through the outer portion, the N-type and P-type doping impurities having different diffusion rates, the N-type doping impurity having the higher diffusion rate, diffusing the N-type and P-type impurities carried by the member into the blank, the N-type doping impurities penetrating further into the blank than the P-type doping impurity and in conjunction with the surface portion of the blank carrying N-type doping impurity providing a base element, the zone from which the doping impurities are diffused being dominated by the P-type doping impurity having the slower diffusion rate becoming an emitter and fusing a member carrying a P-type doping impurity to the blank, the P-type doping impurity penetrating the portion of the blank into which an N-type doping impurity was diffused, and in conjunction with the part of the blank in which a P-type doping impurity is dominant providing a collector.

7. In the process of making a transistor, the steps of preparing a blank from a crystal of an intrinsic semiconductor having high resistivity characteristics, diffusing into an outer surface portion of the blank a doping impurity having predetermined carrier characteristics, fusing into the outer surface portion so doped a member carrying doping impurities of two different carrier characteristics, the member penetrating through the outer portion, the doping impurities carried by the member having different diffusion rates, the impurity having the higher diffusion rate being of the same carrier characteristic as the doping impurity diffused into the surface portion of the blank, diffusing the doping impurities carried by the member into the blank, the doping impurity having the same carrier characteristics as the impurity diffused into the surface portion of the blank penetrating further into the blank and in conjunction with the surface portion of the blank carrying a diffused doping impurity providing a base element, the zone in which the doping impurity having the lower diffusion rate is dominant providing an emitter, and fusing a member carrying a doping impurity having the same carrier characteristic as the emitter to the blank, the doping impurity penetrating the surface portion of the blank having the same carrier characteristic as the base element and entering the blank portion having high resistivity characteristics thereby providing a collector.

8. In the process of making a transistor, the steps of, preparing a blank from a crystal having high resistivity N-type characteristics, diffusing into the outer surface of the blank an N-type doping impurity, fusing into the outer surface of the blank so doped a member carrying N-type and P-type doping impurities having different diffusion rates, the member penetrating through the outer portion, the N-type doping impurity having the higher diffusion rate, diffusing the N-type and P-type impurities carried by the member into the blank, the N-type doping impurity penetrating into the blank and in conjunction with the portion of the blank doped with an N-type impurity providing a base element, the N-type doping impurity leaving a zone dominated by a P-type doping impurity to provide an emitter element, fusing an element carrying a P-type doping impurity to the blank, the P-type doping impurity penetrating the portion of the blank into which an N-type doping impurity was diffused and entering the portion of the blank having high resistivity characteristics providing a collector.

9. In the process of making a transistor, the steps of, preparing a blank from a crystal having high resistivity P-type characteristics, diffusing into an outer portion of the blank a P-tpe doping impurity to provide a heavily doped P-type layer fusing into the outer portion of the blank so doped a member carrying doping impurities of the N-type and P-type, the member penetrating through the outer portion, the N-type and P-type impurities carried by the member having different diffusion rates, the impurity of P-type having a higher diffusion rate than the impurity of N-type and diffusing the impurities carried by the member fused to the blank further into the blank, the P-type impurity penetrating further into the blank than the N-type impurity and in conjunction with the portion of the blank doped with a P-type doping impurity by diffusion providing a base element, the zone of the blank dominated by the N-type doping impurity of slower diffusion rate constituting an emitter, fusing a member carrying an N-type doping impurity to the blank causing the N-type impurity to penetrate the portion of the blank doped with a P-type impurity and enter the portion of the blank having high resistivity and P-type doping characteristics providing a collector.

10. In the process of making a transistor, the steps of preparing a blank from a crystal doped in growing to give it a predetermined carrier characteristic, diffusing into an outer portion of the blank doping impurities of the opposite carrier characteristic from the carrier characteristic of the impurities in the blank, fusing into the outer portion of the blank so doped a member carrying doping impurities of two different carrier characteristics, the member penetrating through the outer portion, the doping impurities carried by the member having different diffusion rates, the doping impurity having the higher diffusion rate being of the same carrier characteristic as the doping impurities diffused into the outer portion of the blank, diffusing the doping impurities carried by the member fused to the blank further into the blank and controlling the time of diffusion to provide zones of predetermined depths in which doping impurities of opposite carrier characteristics are dominant, the doping impurity having the same carrier characteristic as the doping impurity introduced into the outer portion of the blank by diffusion connecting with the outer portion of the blank doped by diffusion, thereby forming a three element structure in which the carrier doping characteristics alternate.

11. In a transistor, in combination, a blank in which a doping material having a predetermined carrier characteristic is dominant, a surface zone of predetermined thickness of the blank doped with an impurity having the opposite carrier characteristic from the doping impurity carried by the blank, an alloy member comprising both kinds of doping impurities fused to the blank, the member penetrating through the thickness of the surface zone, a zone adjacent the member, the zone being dominated by a doping impurity having opposite characteristics from the doping impurity in the surface zone and constituting an emitter, a second zone next to and extending beyond the first zone and dominated by a doping impurity of opposite characteristic to the doping characteristic in the first zone and connected to the surface zone forming a base, both zones being doped by controlled diffusion of the two impurities in the member and therefore of predetermined thickness, and a collector terminal carrying a doping impurity of the same carrier characteristic as the doping impurity introduced into the blank, the collector terminal being fused to the blank and connecting with the portion of the blank dominated by the doping impurity in the body of the blank as prepared.

12. In a transistor, in combination, a blank carrying a preponderance of P-type doping impurity, a surface zone of predetermined thickness of the blank in which N-type doping impurity is dominant, a member comprising both N- and P-type impurities fused to the blank and penetrating through the surface zone, a zone in the blank adjacent the member dominated by P-type doping material providing an emitter, a second zone next to and extending beyond the first zone in which N-type doping impurity is dominant, the second zone in conjunction with the doped surface zone constituting a base, both zones being of predetermined dimensions and a collector terminal fused to the blank, a zone adjacent the collector terminal in which a P-type impurity is dominant, the zone in which the P-type impurity is dominant extending through the surface zone and connected to the body of the blank dominated by P-type impurity forming a collector.

References Cited in the file of this patent

FOREIGN PATENTS 751,408 Great Britain ---------- June 27, 1956

OTHER REFERENCES

The Bell System Technical Journal, vol. 33, No. 3, May 1954, pages 517–533 (particularly page 524).